(12) United States Patent
Palamari et al.

(10) Patent No.: US 10,862,774 B2
(45) Date of Patent: Dec. 8, 2020

(54) UTILIZING MACHINE LEARNING TO PROACTIVELY SCALE CLOUD INSTANCES IN A CLOUD COMPUTING ENVIRONMENT

(71) Applicant: Capital One Services, LLC, McLean, VA (US)

(72) Inventors: Ravi Kiran Palamari, Frisco, TX (US); Ragupathi Subburasu, Frisco, TX (US); Mayur Gupta, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/991,675

(22) Filed: May 29, 2018

(65) Prior Publication Data
US 2019/0372867 A1     Dec. 5, 2019

(51) Int. Cl.
*H04L 12/26*     (2006.01)
*G06F 9/455*     (2018.01)
(Continued)

(52) U.S. Cl.
CPC .......... *H04L 43/04* (2013.01); *G06F 9/45558* (2013.01); *G06F 16/90* (2019.01);
(Continued)

(58) Field of Classification Search
CPC ....... G06N 99/005; H04L 43/04; H04L 43/06; G06F 9/45558; G06F 15/18; G06F 17/30943; G06F 2009/45595
See application file for complete search history.

(56) References Cited

U.S. PATENT DOCUMENTS

| 8,756,610 B2* | 6/2014 | Dasgupta | G06F 9/5077 718/104 |
| 10,572,375 B1* | 2/2020 | Wagner | G06F 16/951 |

(Continued)

OTHER PUBLICATIONS

Sadeka Islam, Jacky Keung, Kevin Lee, and Anna Liu, "Empirical prediction models for adaptive resource provisioning in the cloud", Jun. 25, 2011, Future Generation Computer Systems 28, p. 155-162. (Year: 2011).*

(Continued)

*Primary Examiner* — Kamran Afshar
*Assistant Examiner* — Ying Yu Chen
(74) *Attorney, Agent, or Firm* — Harrity & Harrity, LLP

(57) ABSTRACT

A device receives, from a cloud computing environment, application usage information associated with application instances in the cloud computing environment for an application, and processes the application usage information, with a machine learning model, to determine behavior patterns and predicted tasks for the application. The device determines a modified quantity of the application instances based on the behavior patterns and the predicted tasks for the application, and causes the modified quantity of the application instances to be implemented in the cloud computing environment based on one or more rules. The device stores information associated with the modified quantity of the application instances in a data structure, and updates the machine learning model based on the information associated with the modified quantity of the application instances stored in the data structure.

20 Claims, 13 Drawing Sheets

(51) Int. Cl.
*G06N 20/00* (2019.01)
*G06F 16/90* (2019.01)

(52) U.S. Cl.
CPC ............. *G06N 20/00* (2019.01); *H04L 43/06* (2013.01); *G06F 2009/45595* (2013.01)

(56) References Cited

U.S. PATENT DOCUMENTS

| | | | |
|---|---|---|---|
| 10,733,085 B1* | 8/2020 | Wagner | G06F 16/951 |
| 2013/0007753 A1 | 1/2013 | Jain | |
| 2015/0169291 A1 | 6/2015 | Dube et al. | |
| 2015/0278061 A1 | 10/2015 | Siciliano et al. | |
| 2015/0358391 A1* | 12/2015 | Moon | H04L 67/10 |
| | | | 709/224 |
| 2019/0266070 A1* | 8/2019 | Bhandarkar | G06F 11/079 |

OTHER PUBLICATIONS

Dang Tran, Nhuan Tran, Giang Nguyen, and Binh Minh Nguyen, "A Proactive Cloud Scaling Model Based on Fuzzy Time Series and SLA Awareness", Jun. 9, 2017, Procedia Computer Science 108C (2017), pp. 365-374. (Year: 2017).*

* cited by examiner

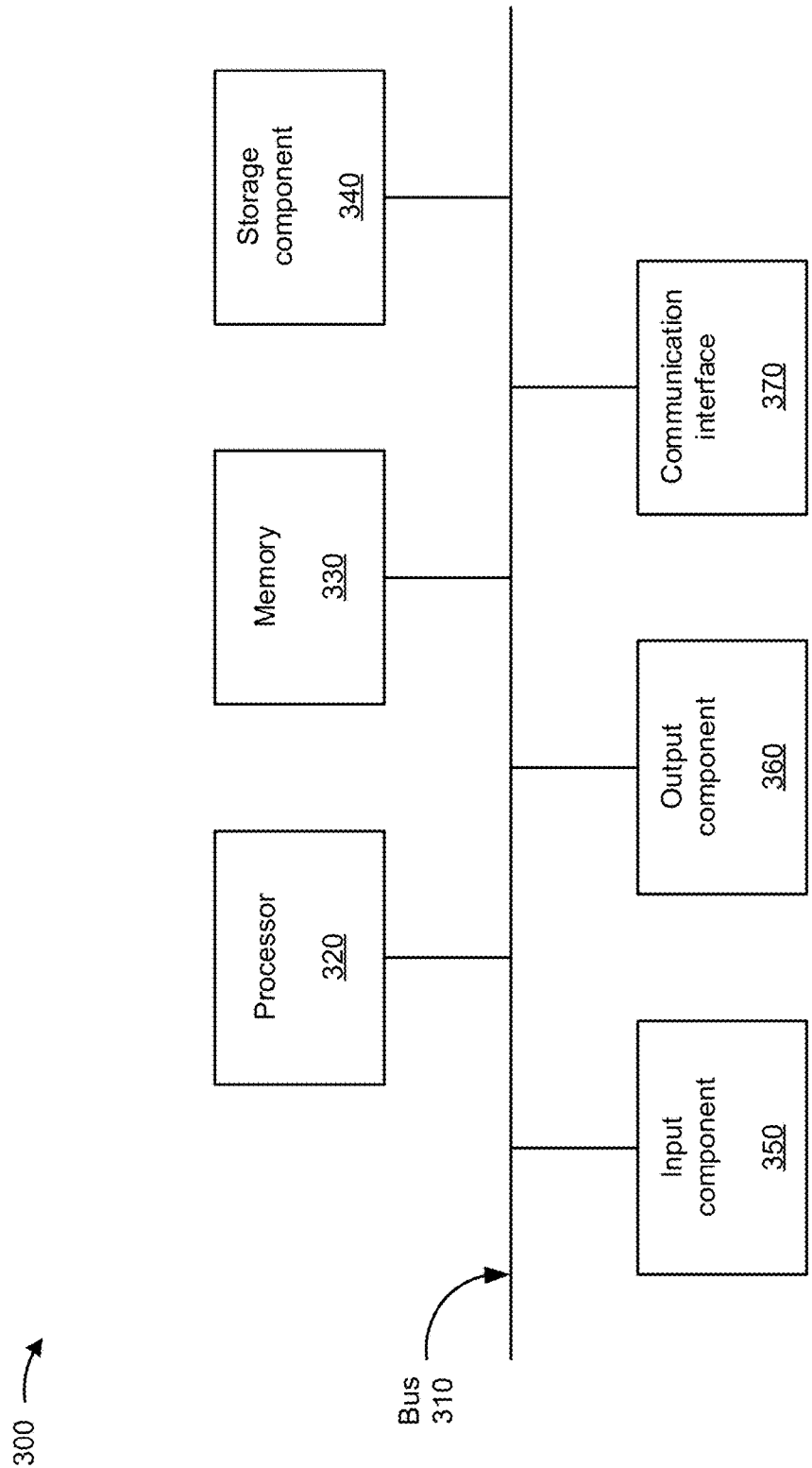

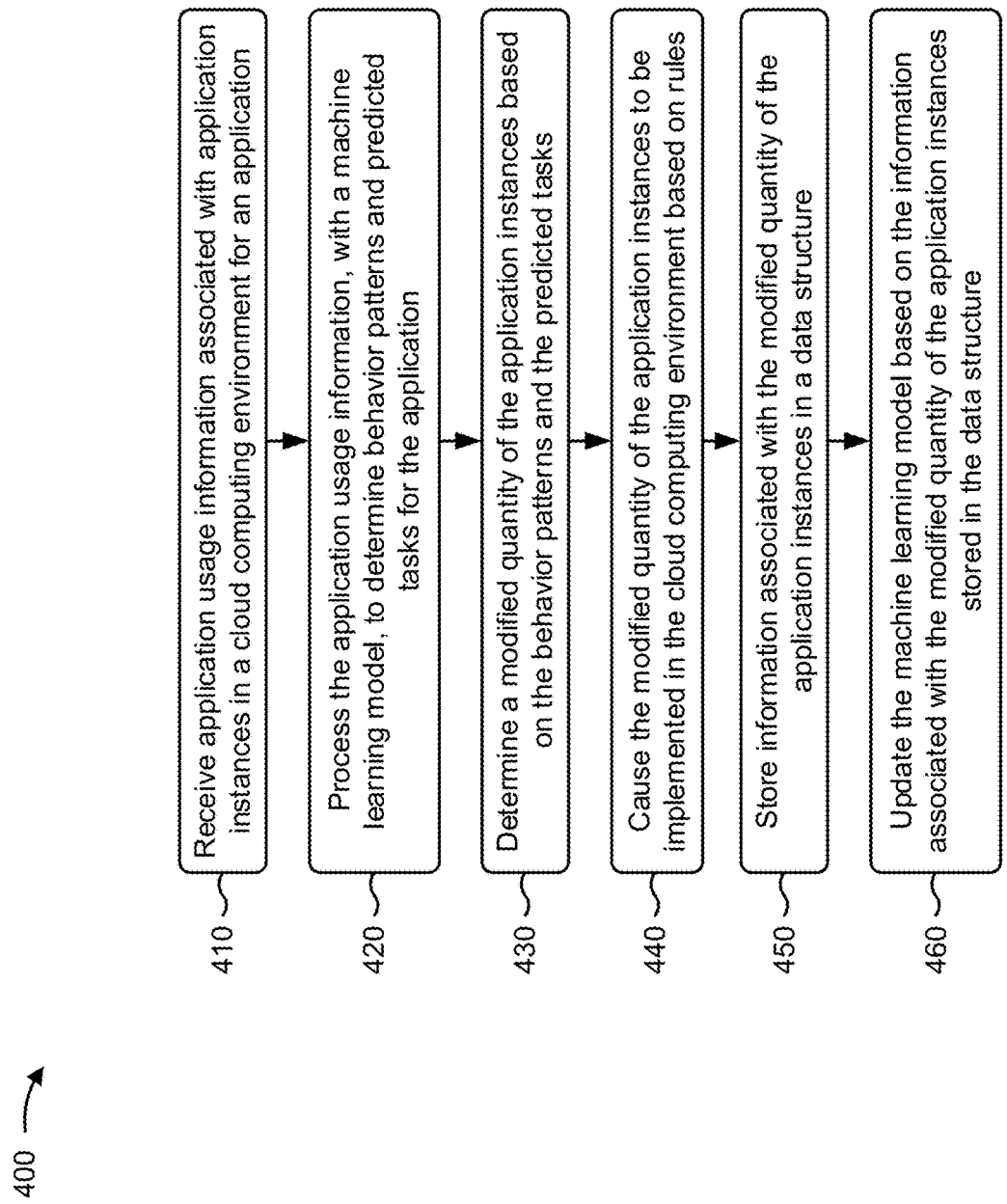

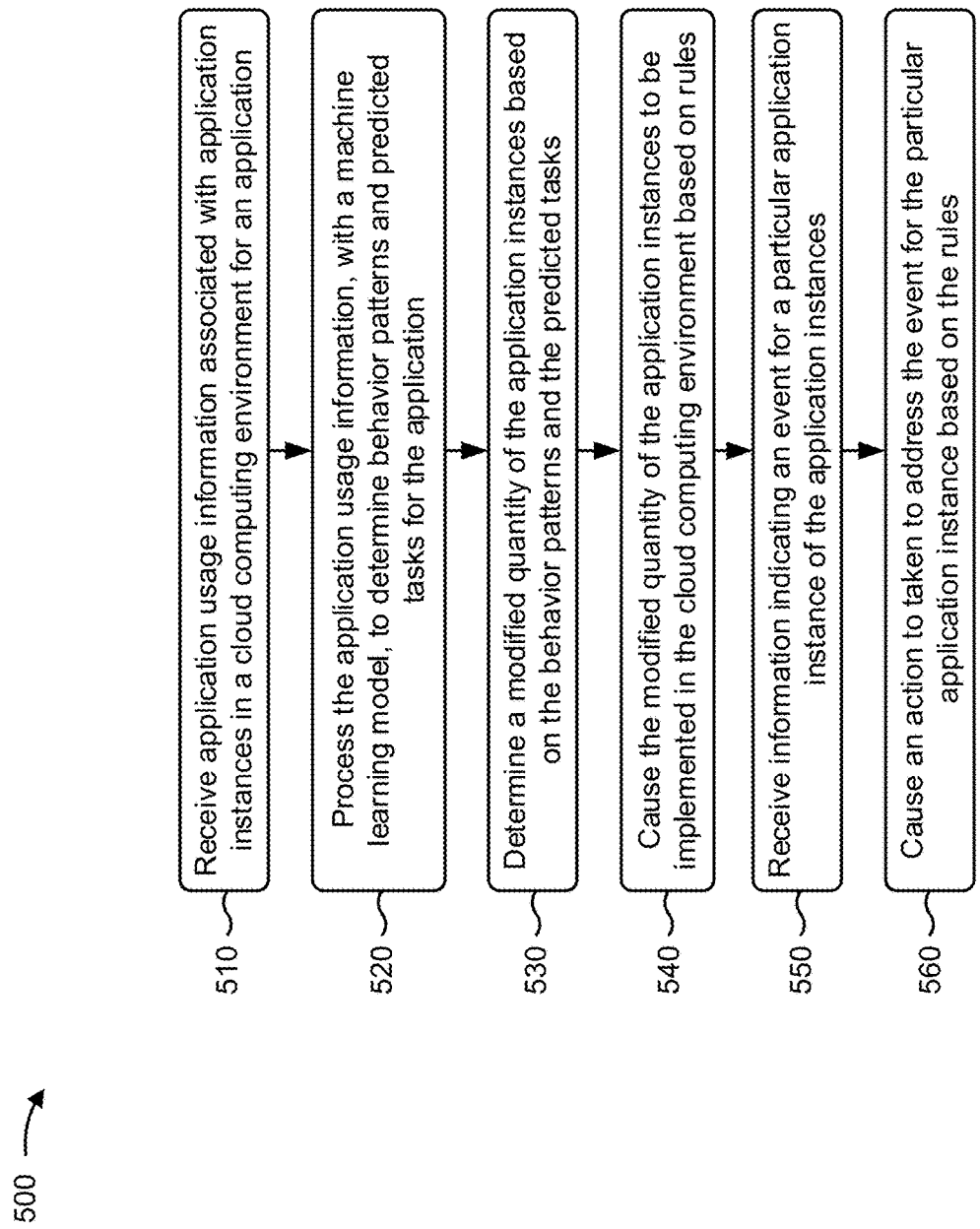

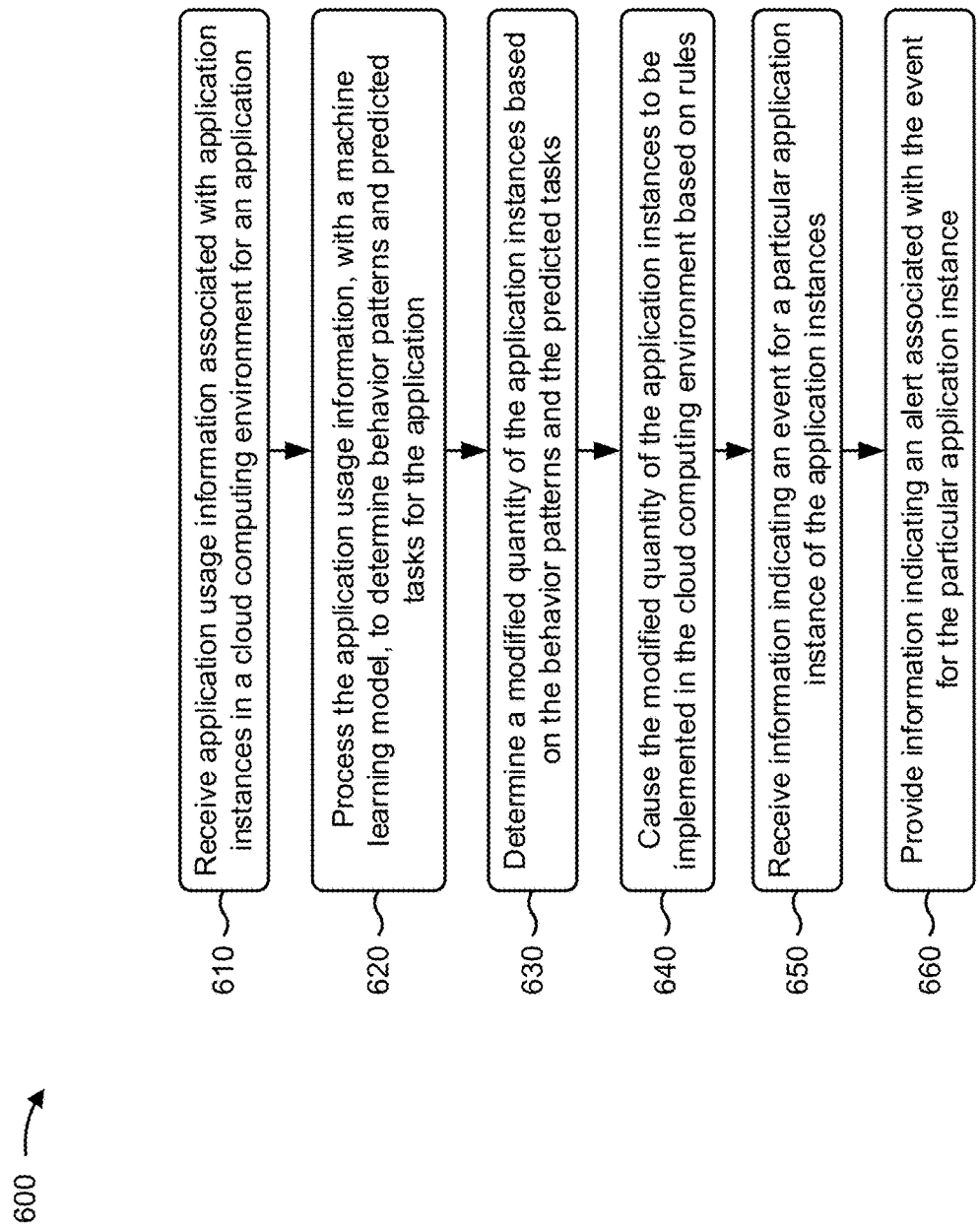

UTILIZING MACHINE LEARNING TO PROACTIVELY SCALE CLOUD INSTANCES IN A CLOUD COMPUTING ENVIRONMENT

BACKGROUND

An entity may utilize a cloud computing environment to provide computation, software, data access, storage, etc. services that do not require end-user knowledge of a physical location and configuration of systems and/or devices that host the services in the cloud computing environment. The cloud computing environment may save costs for the entity since the entity need not purchase hardware systems and/or devices that host the services provided by the cloud computing environment.

SUMMARY

According to some implementations, a device may include one or more memories, and one or more processors, communicatively coupled to the one or more memories, to receive, from a cloud computing environment, application usage information associated with application instances in the cloud computing environment for an application. The one or more processors may process the application usage information, with a machine learning model, to determine behavior patterns and predicted tasks for the application, and may determine a modified quantity of the application instances based on the behavior patterns and the predicted tasks for the application. The one or more processors may cause the modified quantity of the application instances to be implemented in the cloud computing environment based on one or more rules, and may store information associated with the modified quantity of the application instances in a data structure. The one or more processors may update the machine learning model based on the information associated with the modified quantity of the application instances stored in the data structure.

According to some implementations, a non-transitory computer-readable medium may store instructions that include one or more instructions that, when executed by one or more processors of a device, cause the one or more processors to receive, from a cloud computing environment, application usage information associated with application instances in the cloud computing environment for an application. The one or more instructions may cause the one or more processors to process the application usage information, with a machine learning model, to determine behavior patterns and predicted tasks for the application, and determine a modified quantity of the application instances based on the behavior patterns and the predicted tasks for the application. The one or more instructions may cause the one or more processors to cause the modified quantity of the application instances to be implemented in the cloud computing environment based on one or more rules, and receive information indicating an event for a particular application instance of the application instances. The one or more instructions may cause the one or more processors to cause an action to be taken to address the event for the particular application instance based on the one or more rules.

According to some implementations, a method may include receiving, and from a cloud computing environment, application usage information associated with application instances in the cloud computing environment for an application, and processing the application usage information, with a machine learning model, to determine behavior patterns and predicted tasks for the application. The method may include determining a modified quantity of the application instances based on the behavior patterns and the predicted tasks for the application, and causing the modified quantity of the application instances to be implemented in the cloud computing environment based on one or more rules. The method may include receiving information indicating an event for a particular application instance of the application instances, and providing, to a user device, information indicating an alert associated with the event for the particular application instance.

BRIEF DESCRIPTION OF THE DRAWINGS

FIG. 3 is a diagram of example components of one or more devices of FIG. 2.

FIG. 4 is a flow chart of an example process for utilizing machine learning to proactively scale cloud instances in a cloud computing environment.

FIG. 5 is a flow chart of an example process for utilizing machine learning to proactively scale cloud instances in a cloud computing environment and for performing an action to address an event.

FIG. 6 is a flow chart of an example process for utilizing machine learning to proactively scale cloud instances in a cloud computing environment and for providing alerts.

DETAILED DESCRIPTION

The following detailed description of example implementations refers to the accompanying drawings. The same reference numbers in different drawings may identify the same or similar elements.

An entity may utilize a quantity of cloud instances (e.g., virtual machines) of a cloud computing environment to receive an application. However, utilization of the cloud instances, associated with the application, may increase at particular times and the cloud computing environment may not be able to handle the increased utilization in a timely manner. For example, a user of the cloud computing environment may manually monitor the cloud computing environment, and may reactively and manually allocate additional cloud instances for the increased utilization. Unfortunately, the additional cloud instances may not be available prior to impacting productivity of the entity.

Some implementations described herein provide a scaling platform that utilizes machine learning to proactively scale cloud instances in a cloud computing environment. For example, the scaling platform may receive, from a cloud computing environment, application usage information associated with application instances in the cloud computing environment for an application, and may process the application usage information, with a machine learning model, to determine behavior patterns and predicted tasks for the application. The scaling platform may determine a modified quantity of the application instances based on the behavior patterns and the predicted tasks for the application, and may cause the modified quantity of the application instances to be implemented in the cloud computing environment based on one or more rules. The scaling platform may store information associated with the modified quantity of the application instances in a data structure, and may update the machine learning model based on the information associated with the modified quantity of the application instances stored in the data structure.

Figure 1A:
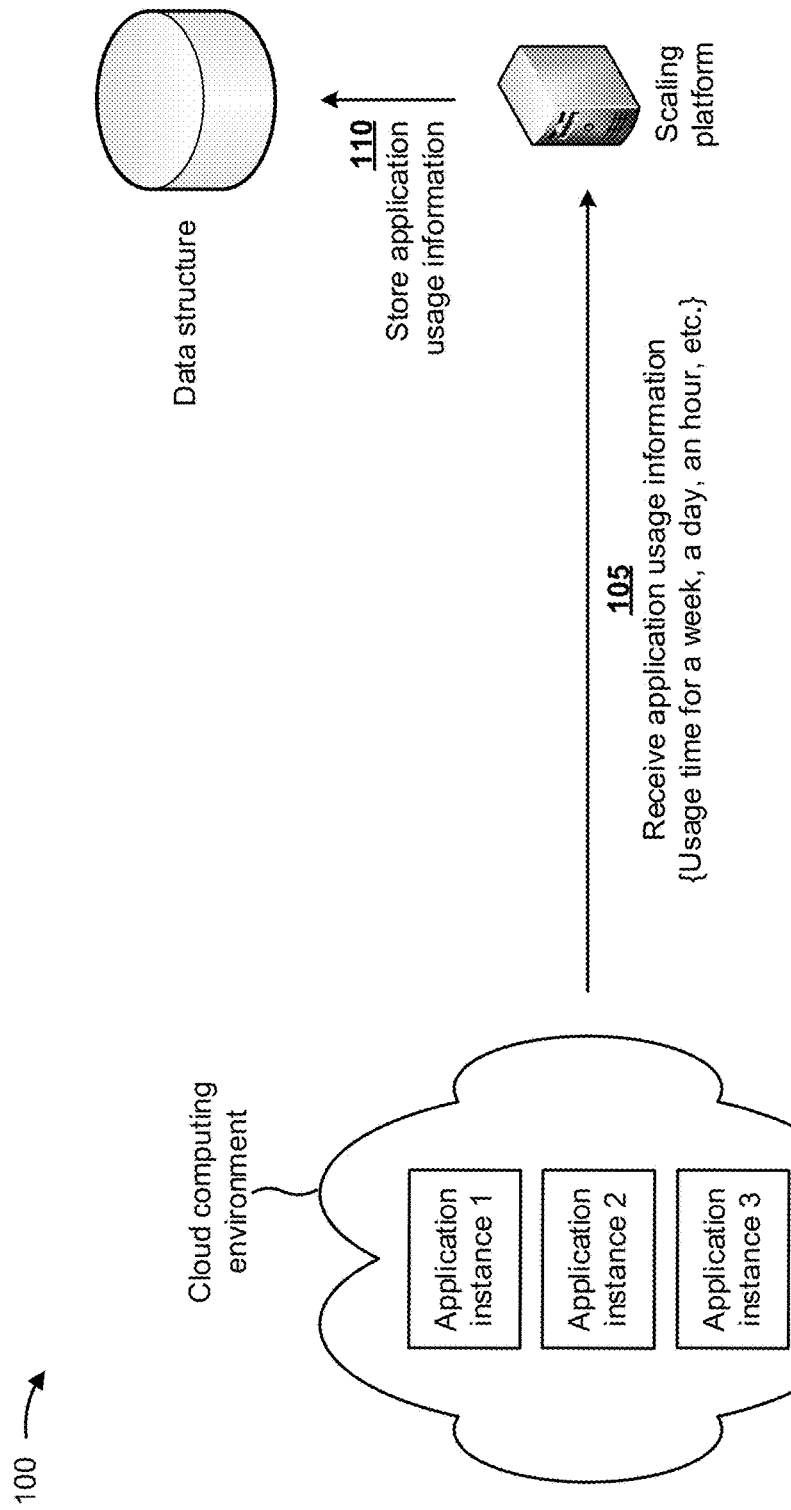
FIGS. 1A-1H are diagrams of an example implementation described herein.

FIGS. 1A-1H are diagrams of an example implementation 100 described herein. As shown in FIG. 1A, a cloud computing environment may be associated with a scaling platform. The cloud computing environment may include cloud instances for different services provided by the cloud computing environment for an entity (e.g., a company, an educational institution, a government agency, and/or the like). For example, the cloud computing environment may include a quantity (e.g., three) of application instances (e.g., virtual machines) that provide services (e.g., application programming interfaces (APIs), database services, miscellaneous services, and/or the like) associated with an application. The quantity of cloud instances depicted in FIG. 1A is provided as an example, and the cloud computing environment may include more or fewer cloud instances than shown in FIG. 1A. In some implementations, the application instances may be provided among multiple cloud computing environments, and techniques described herein may apply seamlessly across the multiple cloud computing environments.

As further shown in FIG. 1A, and by reference number 105, the scaling platform may receive application usage information from the cloud computing environment. In some implementations, the scaling platform may continuously receive the application usage information, may periodically receive the application usage information, and/or the like. In some implementations, the scaling platform may store the application usage information in a memory device associated with the scaling platform. In some implementations, the application usage information may include information indicating usage of the application (e.g., the application instances) during different time periods, such as an hour, a day, a week, a month, a year, and/or the like; tasks performed by the application during the different time periods; usage on a per application instance basis; in which cloud computing environment an application instance is provided; on which computing resource an application instance is provided; timestamps associated with usage by each application instance; which users are using the application instances; geographical location information associated with the users; tasks performed by the user; and/or the like.

As further shown in FIG. 1A, and by reference number 110, the scaling platform may store the application usage information in a data structure associated with the scaling platform. In some implementations, the data structure may include a database, a table, a linked list, a tree, and/or the like. In some implementations, the scaling platform may continuously store the application usage information in the data structure, may periodically store the application usage information in the data structure, and/or the like.

Figure 1B:
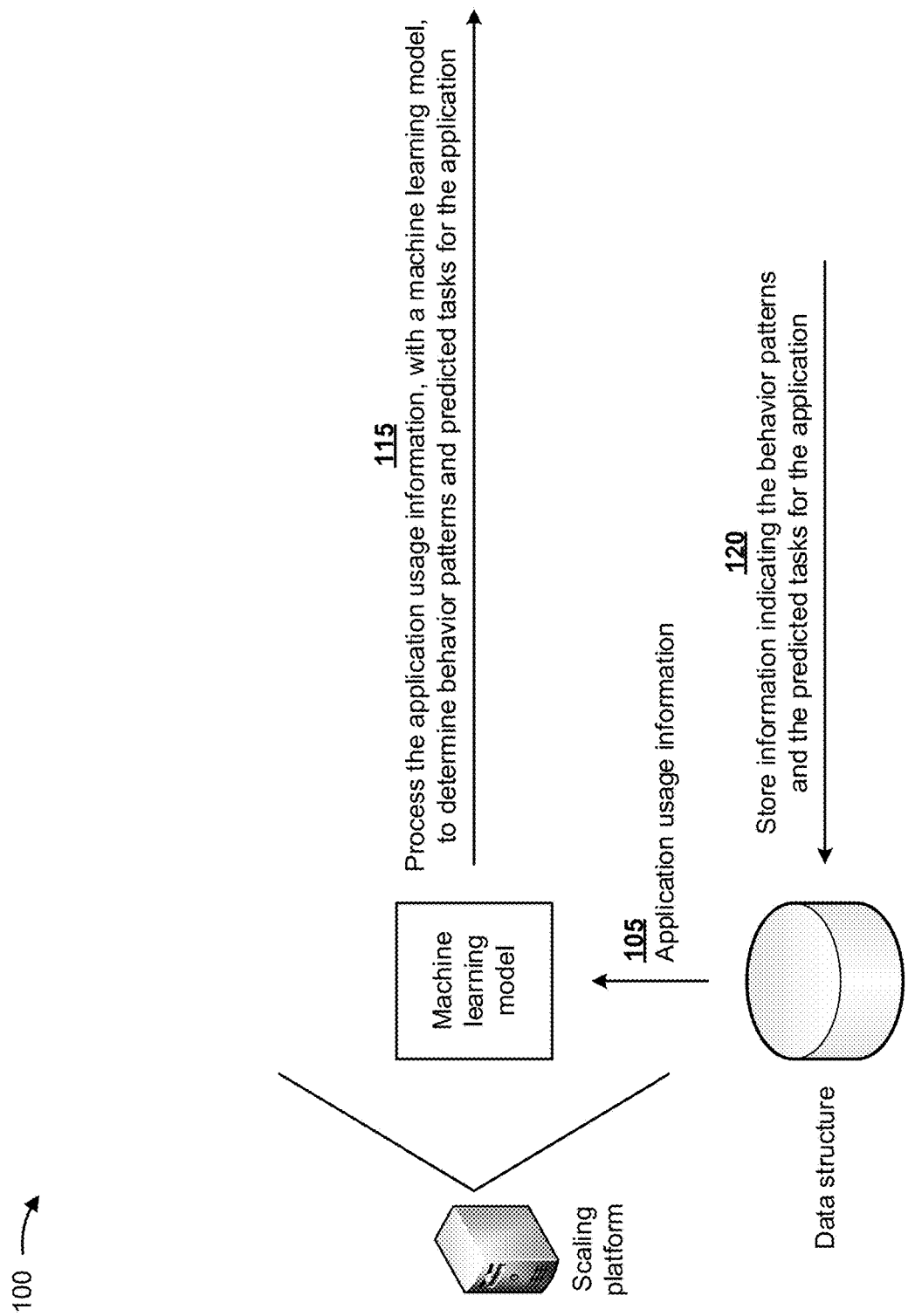

As shown in FIG. 1B, and by reference numbers 105 and 115, the scaling platform may process the application usage information, with a machine learning model, to determine behavior patterns and predicted tasks for the application. In some implementations, the behavior patterns for the application information indicating time periods when the application is over-utilized (e.g., a particular hour of a day, a particular day of a week, a particular week of month, and/or the like) and a quantity of the application instances may be scaled up, time periods when the application is underutilized and the quantity of the application instances may be scaled back, and/or the like. In some implementations, the predicted tasks for the application may include information predicting tasks, performed by the application, that cause the application to be over-utilized and that cause the quantity of the application instances to be incapable of handling the utilization; tasks, performed by the application, that cause the application to be underutilized and that indicate that the quantity of the application instances may be scaled back; and/or the like.

In some implementations, the machine learning model may analyze the usage of the application during the different time periods (e.g., provided by the application usage information), and may determine the behavior patterns of the application based on analyzing the usage of the application during the different time periods. For example, the machine learning model may determine that the application is over-utilized, and that the quantity of the application instances cannot handle the utilization between 3:00 PM and 4:30 PM each day during a work week since business reports are due every day by 4:30 PM.

In some implementations, the machine learning model may analyze the tasks performed by the application during the different time periods (e.g., provided by the application usage information), and may determine the predicted tasks of the application based on analyzing the tasks performed by the application during the different time periods. For example, the machine learning model may determine that the application is underutilized, and that the quantity of the application instances may be scaled back every Friday afternoon since most employees of the entity leave work early on Friday.

In some implementations, the scaling platform may train the machine learning model with training data to form rules, for the machine learning model, that will predict behavior patterns for an application, predicted tasks for an application, and/or the like. In such implementations, the training data may include information indicating current utilizations of the application instances, the cloud computing environments where the application instances are located, which application instances are located in which cloud computing environments, processor load in each application instance, processor load in each cloud computing environment, memory load in each cloud computing environment, memory load in each application instance, computing resource load in each cloud computing environment, computing resource load in each application instance, which application instances are located on which computing resources, a quantity of the application instances in each cloud computing environment, a quantity of the cloud computing environments, future utilizations of the application instances, future utilizations of the cloud computing environment, and/or the like.

In some implementations, the scaling platform may test the machine learning model. For example, the scaling platform may train the machine learning model based on the training data to predict outcomes (e.g., behavior patterns for an application, predicted tasks for an application, and/or the like). The scaling platform may compare the predicted outcomes with expected outcomes in order to test the machine learning model. In some implementations, the scaling platform may continuously update the machine learning model based on the testing and by incremental learning, reinforcement learning, online learning, and/or the like. The scaling platform may repeat this procedure until correct predictions are generated by the machine learning model.

In some implementations, the machine learning model may output information indicating time periods when an application is over-utilized (e.g., a particular hour of a day, a particular day of a week, a particular week of month, and/or the like), time periods when a quantity of the application instances may be scaled up, time periods when the application is underutilized, time periods when the quantity of the application instances may be scaled back, and/or the like.

In some implementations, the scaling platform may utilize the output of the machine learning model to cause one or more cloud computing environments to remove one or more application instances, add one or more application instances, to more efficiently process information, and/or the like; to reduce resource utilization by the one or more cloud computing environments; to save costs associated with the reduced resource utilization; to prevent overutilization of application instances by the one or more cloud computing environments; to ensure that the application is available during particular time periods; and/or the like.

In some implementations, the scaling platform may manage tens, hundreds, or more cloud computing environments that include thousands, millions, or more cloud instances, and millions, trillions, or more data items, and thus may present a big data problem. In some implementations, the scaling platform may utilize the machine learning model to proactively scale the cloud instances in each of the cloud computing environments. In this way, the scaling platform may manage a complex, big data problem quickly and efficiently.

In some implementations, the machine learning model may include one or more of a simple linear regression model, an ordinary least squares model, a gradient descent model, a Ridge regression model, a least absolute shrinkage and selection operator (Lasso) regression analysis model, a neural network model, and/or the like.

The simple linear regression model may include a linear regression model with a single explanatory variable. That is, the simple linear regression model handles two-dimensional sample points with one independent variable and one dependent variable (e.g., the x and y coordinates in a Cartesian coordinate system) and determines a linear function (e.g., a non-vertical straight line) that predicts, as accurately as possible, the dependent variable values as a function of the independent variables. The simple linear regression model may be referred to as simple due to the outcome variable being related to a single predictor.

The ordinary least squares model may include a machine learning model that employs a method for estimating unknown parameters in a linear regression model. The ordinary least squares model chooses the parameters of a linear function of a set of explanatory variables by minimizing a sum of squares of differences between an observed dependent variable (e.g., values of a variable being predicted) in a dataset and variables predicted by the linear function. Geometrically, this can be represented as a sum of the squared distances, parallel to an axis of the dependent variable, between each data point in the dataset, and a corresponding point on a regression line.

The gradient descent model may include a machine learning model that employs a first-order iterative optimization for determining a minimum of a function. To determine a local minimum of a function using gradient descent, the gradient descent model takes steps proportional to a negative of a gradient (or of an approximate gradient) of the function at a current point. The gradient descent model may operate in spaces with any quantity of dimensions, including infinite-dimensional spaces.

The Ridge regression model may include a machine learning model that employs a technique for analyzing multiple regression data that suffer from multicollinearity. Multicollinearity is the existence of near-linear relationships among independent variables, which can create inaccurate estimates of regression coefficients, inflate standard errors of the regression coefficients, degrade predictability of the model, and/or the like. When multicollinearity occurs, least squares estimates are unbiased, but variances of the estimates are large and the estimates may be far from a true value. By adding a degree of bias to the regression estimates, the Ridge regression model reduces the standard errors, with an objective that a net effect may provide estimates that are more reliable.

The Lasso regression analysis model may include a regression analysis model that performs both variable selection and regularization in order to enhance a prediction accuracy and interpretability of a statistical model that the Lasso regression analysis model produces. For example, the Lasso regression analysis model may include a shrinkage and selection model for linear regression, and may seek to obtain a subset of predictors that minimizes prediction error for a quantitative response variable. In some implementations, the Lasso regression analysis model may minimize the prediction error by imposing a constraint on the model parameters that cause regression coefficients for some variables to shrink toward zero. Variables with a regression coefficient equal to zero after the shrinkage process may be excluded from the model, while variables with non-zero regression coefficient variables are most strongly associated with the quantitative response variable.

The neural network model may include a model that uses an artificial neural network (e.g., to determine one or more of the criteria). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which it is connected. In common artificial neural network implementations, the signal at a connection between artificial neurons is a real number, and the output of each artificial neuron is calculated by a non-linear function. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

In this way, the scaling platform may utilize one or more machine learning models to determine the behavior patterns and the predicted tasks for the application. In some implementations, the scaling platform may select which one or more of the machine learning models to utilize based on the application usage information, user input, and/or the like. In some implementations, the scaling platform may utilize multiple machine learning models, may weight results of the multiple machine learning models, and may combine the results to obtain a final result (e.g., the behavior patterns and the predicted tasks for the application).

As further shown in FIG. 1B, and by reference number 120, the scaling platform may store information indicating the behavior patterns and the predicted tasks, for the application, in the data structure. In some implementations, the scaling platform may utilize the information indicating the behavior patterns and the predicted tasks for the application to update the machine learning model. For example, the scaling platform may utilize the information indicating the behavior patterns and the predicted tasks for the application as training data for training the machine learning model.

Figure 1C:
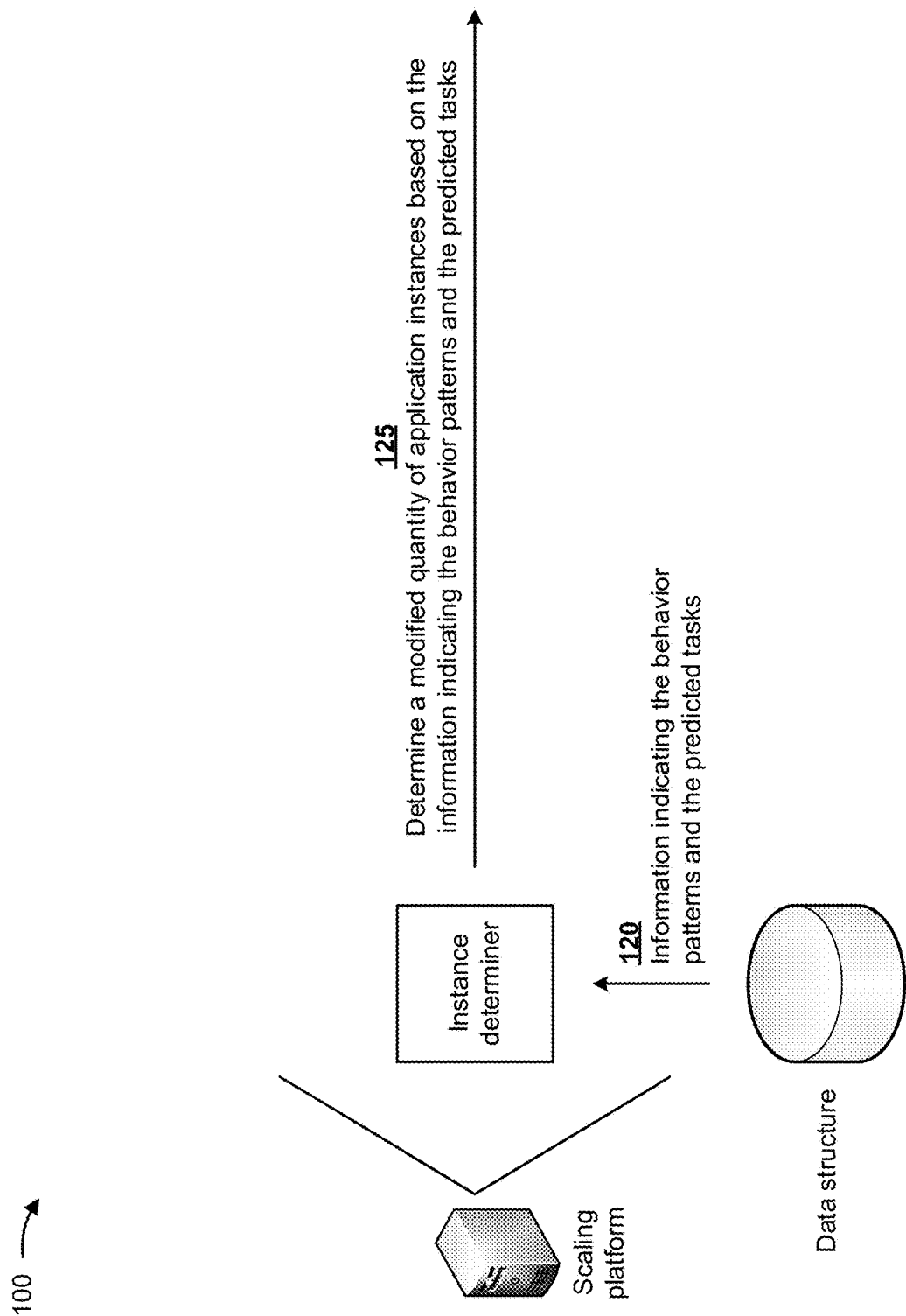

As shown in FIG. 1C, and by reference number 120, the scaling platform may receive the information indicating the behavior patterns and the predicted tasks for the application from the data structure. As further shown in FIG. 1C, and by reference number 125, the scaling platform may determine a modified quantity of the application instances, for the cloud computing environment, based on the information indicating the behavior patterns and the predicted tasks for the application. In some implementations, the scaling platform may determine to increase (e.g., scale up) the quantity of the application instances based on the information indicating the behavior patterns and the predicted tasks for the application. For example, if the behavior patterns for the application indicate that in an upcoming time period the application may be over-utilized and the quantity of the application instances may not handle the utilization, and/or the predicted tasks indicate that the application may perform tasks that cause the application to be over-utilized and may cause the quantity of the application instances to be incapable of handling the utilization, the scaling platform may increase the quantity of the application instances. In such implementations, the increased quantity of the application instances may handle the utilization of the application and may prevent the application from being over-utilized.

In some implementations, the scaling platform may determine to decrease (e.g., scale down) the quantity of the application instances based on the information indicating the behavior patterns and the predicted tasks for the application. For example, if the behavior patterns for the application indicate that in an upcoming time period the application may be underutilized and the quantity of the application instances may be scaled back, and/or the predicted tasks indicate that the application may perform tasks that cause the application to be underutilized and the quantity of the application instances may be scaled back, the scaling platform may decrease the quantity of the application instances. In such implementations, the decreased quantity of the application instances may handle the utilization of the application and may conserve resources (e.g., processing resources, memory resources, etc.) associated with underutilized application instances.

In some implementations, the scaling platform may determine to maintain (e.g., not scale) the quantity of the application instances based on the information indicating the behavior patterns and the predicted tasks for the application. For example, if the behavior patterns and predicted tasks for the application indicate that, in an upcoming time period, the quantity of the application instances will sufficiently handle the predicted tasks of the application, the scaling platform may maintain the quantity of the application instances.

Figure 1D:
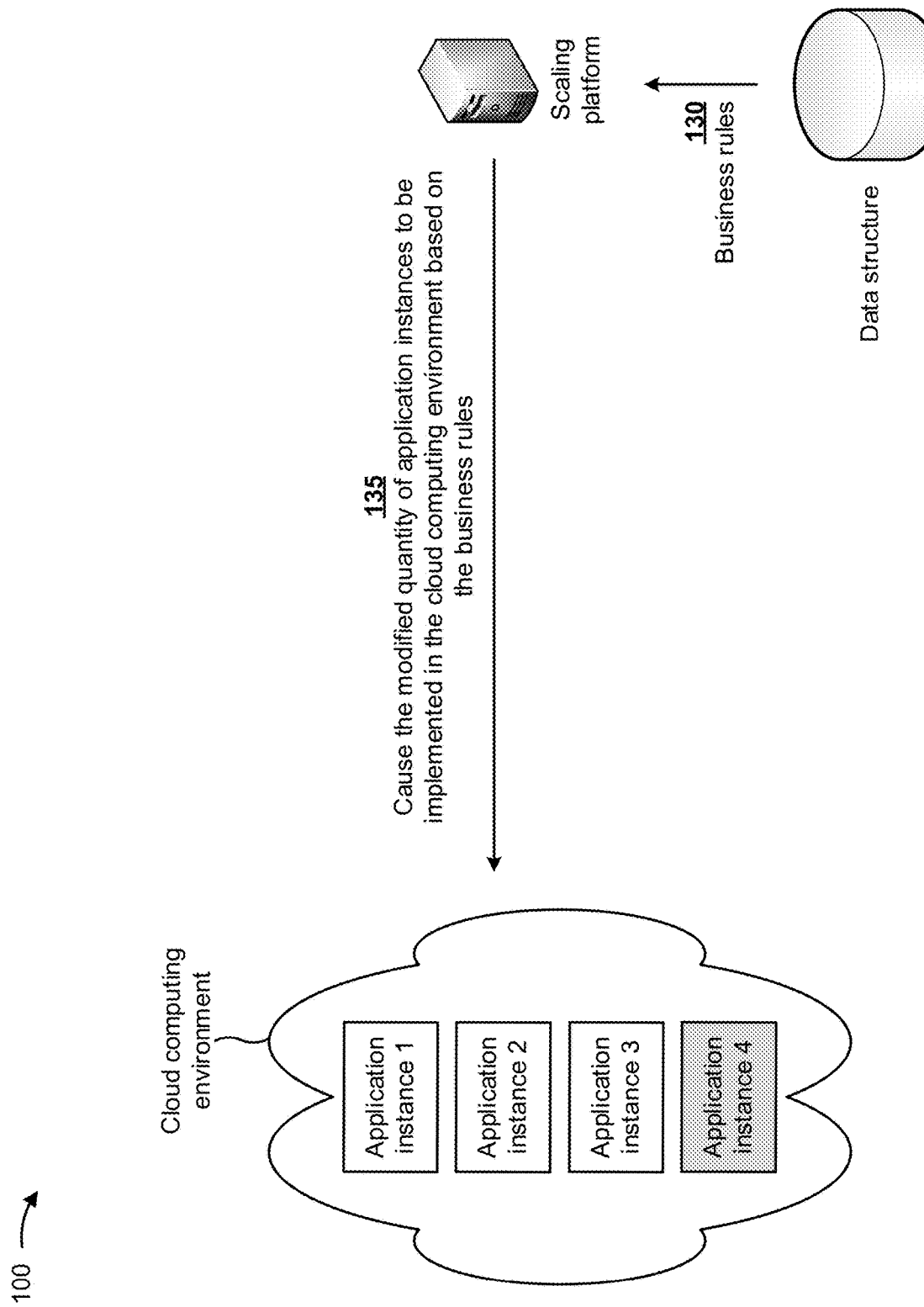

As shown in FIG. 1D, and by reference number 130, the data structure may store business rules, and the scaling platform may receive the business rules from the data structure. In some implementations, the business rules may include rules indicating a maximum quantity of the application instances in the cloud computing environment for the entity, a maximum cost the entity will pay for the application instances, a minimum quantity of the application instances in the cloud computing environment for the entity, an availability threshold associated with the application instances (e.g., available 99.999 percent of the time), and/or the like.

As further shown in FIG. 1D, and by reference number 135, the scaling platform may cause the modified quantity of the application instances to be implemented in the cloud computing environment, based on the business rules. In some implementations, the scaling platform may cause the cloud computing environment to increase the quantity of the application instances, decrease the quantity of the application instances, or maintain the quantity of the application instances, based on the business rules. For example, if the scaling platform determines that the quantity of the application instances is to be increased (e.g., by two application instances) and the business rules indicate that the increased quantity of the application instances is less than the maximum quantity of the application instances, the scaling platform may increase the quantity of the application instances. In another example, if the scaling platform determines that the quantity of the application instances is to be decreased (e.g., by three application instances) and the business rules indicate that the decreased quantity of the application instances will maintain the availability threshold associated with the application instances, the scaling platform may decrease the quantity of the application instances.

In some implementations, the scaling platform may cause the modified quantity of the application instances to be implemented in the cloud computing environment by providing, to the cloud computing environment, information (e.g., an instruction) instructing the cloud computing environment to implement the modified quantity of the application instances (e.g., increase or decrease the quantity of the application instances). The cloud computing environment may receive the instruction, and may increase or decrease the quantity of the application instances based on the instruction. For example, as further shown in FIG. 1D, the cloud computing environment may increase the quantity of the application instances by one (e.g., by adding application instance 4 to the cloud computing environment). In some implementations, the cloud computing environment may increase or decrease more or fewer application instances than depicted in FIG. 1D.

Figure 1E:
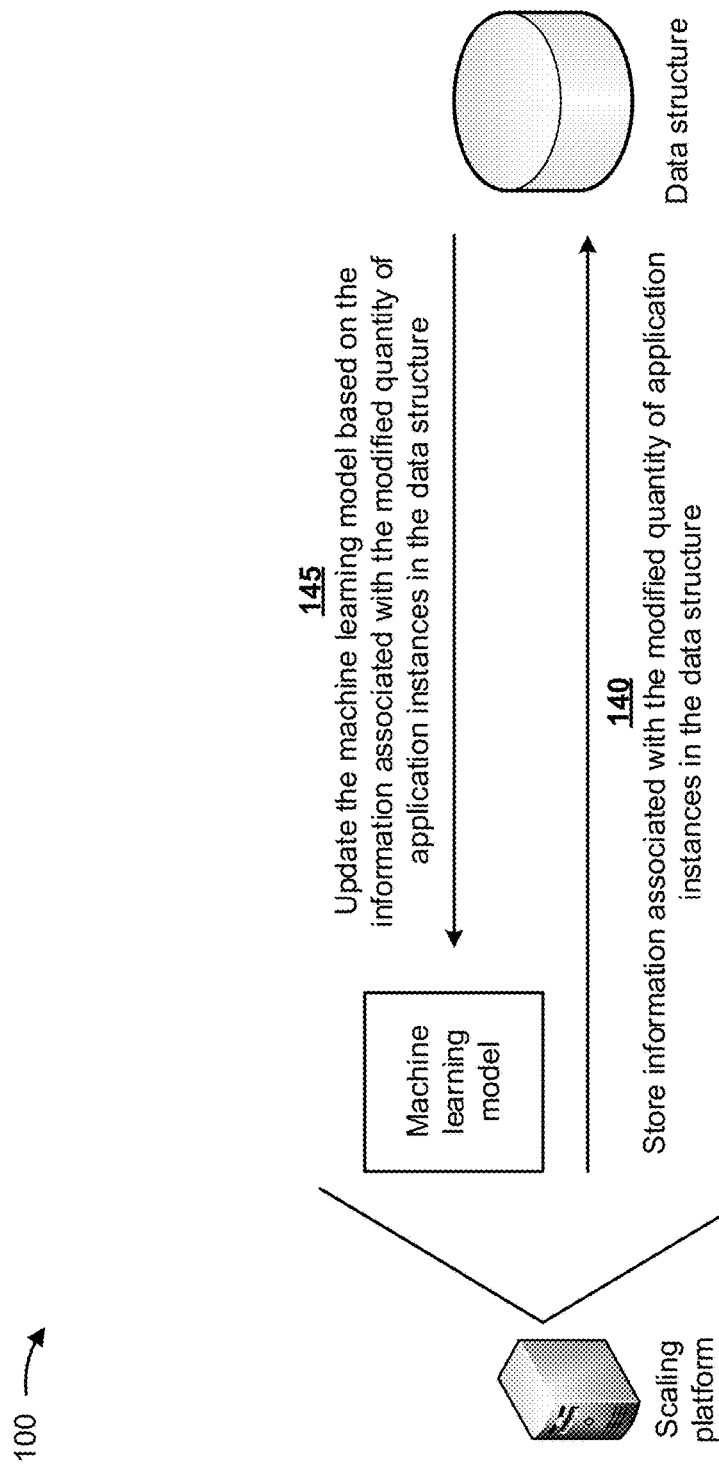

As shown in FIG. 1E, and by reference number 140, the scaling platform may store information associated with the modified quantity of the application instances in the data structure. As further shown in FIG. 1E, and by reference number 145, the scaling platform may update the machine learning model based on the information associated with the modified quantity of the application instances. For example, the scaling platform may utilize the information associated with the modified quantity of the application instances as training data for training the machine learning model.

Figure 1F:
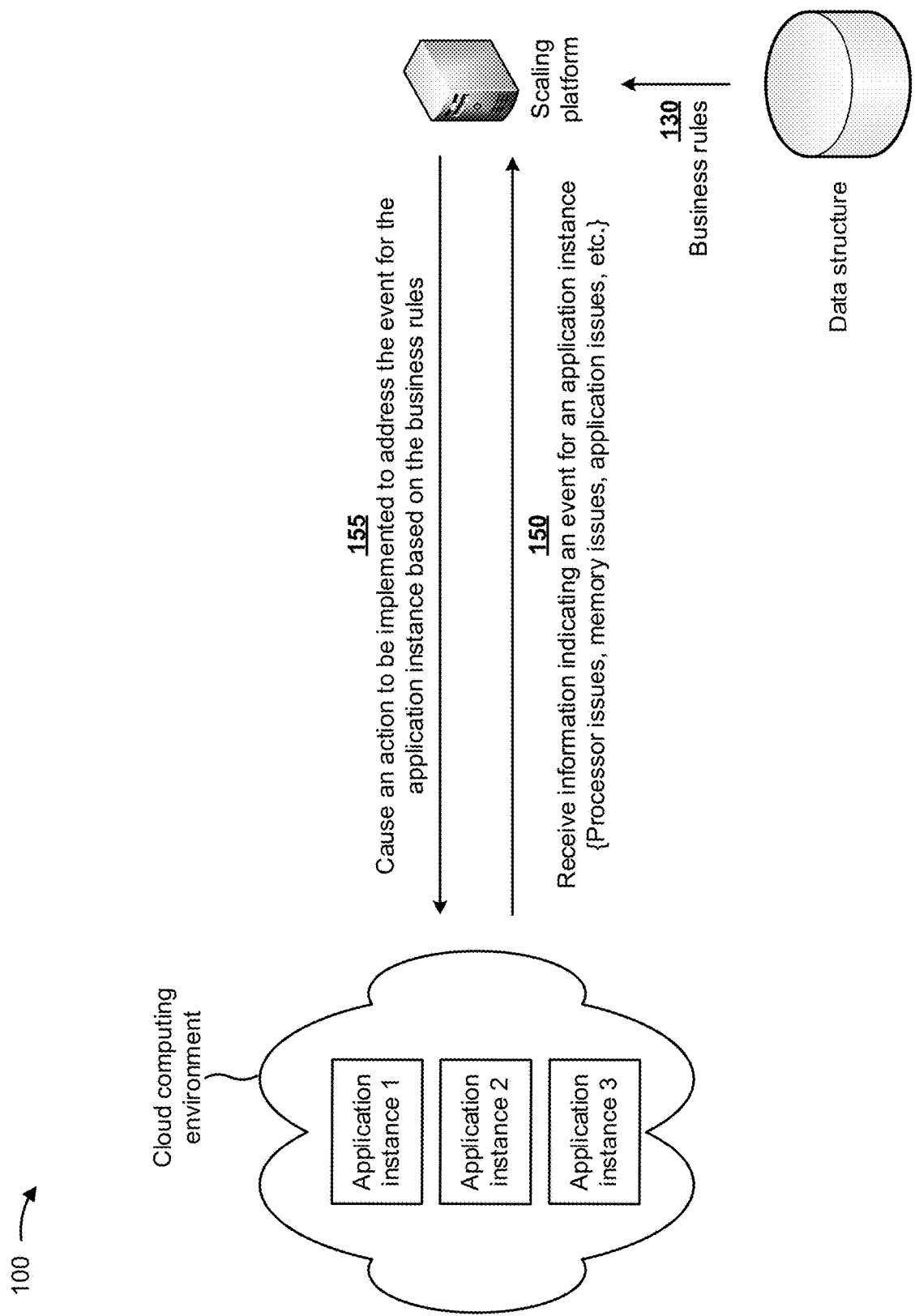

As shown in FIG. 1F, and by reference number 150, the scaling platform may receive, from the cloud computing environment, information indicating an event for a particular application instance in the cloud computing environment. In some implementations, the event may include processor issues associated with the particular application instance (e.g., a processor failure, a processor error, etc.), memory issues associated with the particular application instance (e.g., memory failure, memory error, memory at capacity, etc.), application issues associated with the particular application instance (e.g., code errors, non-executing code, code failures, etc.), and/or the like.

As further shown in FIG. 1F, and by reference numbers 130 and 155, the scaling platform may cause an action to be implemented in the cloud computing environment to address the event for the particular application instance, based on the business rules. In some implementations, the scaling platform may cause the action to address the event to be implemented in the cloud computing environment by providing, to the cloud computing environment, information instructing the cloud computing environment to implement the action to address the event. The cloud computing environment may receive the instruction, and may implement the action to address the event in the cloud computing environment based on the instruction.

In some implementations, the action may include correcting the processor issues associated with the particular application instance, correcting the memory issues associated with the particular application instance, correcting the application issues associated with the particular application instance, replacing the particular application instance with a new application instance, restarting the particular application instance, and/or the like. In some implementations, the action selected may be selected based on the business rules. For example, if the business rules indicate that the particular application instance is to have minimal downtime, the selected action may include replacing the particular application instance with a new application instance in order prevent or minimize downtime associated with the particular application instance.

Figure 1G:
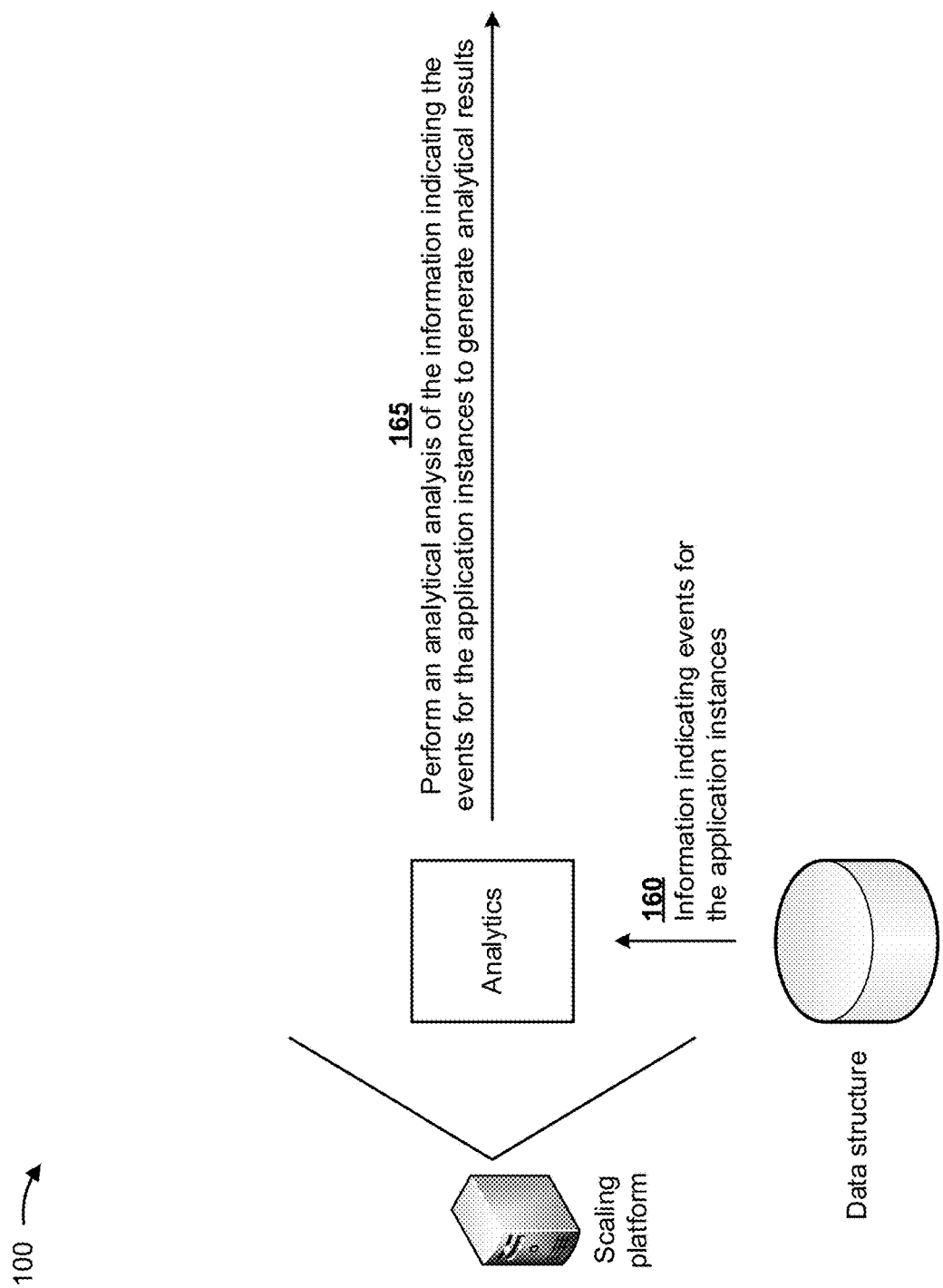

As shown in FIG. 1G, and by reference number 160, the scaling platform may receive, from the data structure, information indicating events for the application instances. In some implementations, every time an event is received, the scaling platform may store information associated with the received event. In some implementations, the information indicating the events for the application instances may include information indicating actions taken to address the events. In some implementations, the scaling platform may update the machine learning model based on the information indicating the events for the application instances. For example, the scaling platform may utilize the information indicating the events for the application instances as training data for training the machine learning model.

As further shown in FIG. 1G, and by reference number 165, the scaling platform may perform an analytical analysis of the information indicating the events for the application instances, and may generate analytical results based on the analysis. In some implementations, the analytical analysis may include an anomaly detection technique. An anomaly detection technique may include a technique that identifies items that do not conform to an expected pattern or other items in a dataset (e.g., anomalous items), and that may provide an indication of some type of problem. In some implementations, the scaling platform may utilize an anomaly detection technique with the information indicating the events for the application instances to identify one or more underlying problems associated with the application instances. For example, the scaling platform may utilize events indicating a code failure associated with one or more application instances to determine that a portion of the code is causing the code failure and needs to be rewritten or removed. In another example, the scaling platform may utilize events indicating processor errors associated with one or more application instances to determine that the one or more application instances are being over-utilized.

Figure 1H:
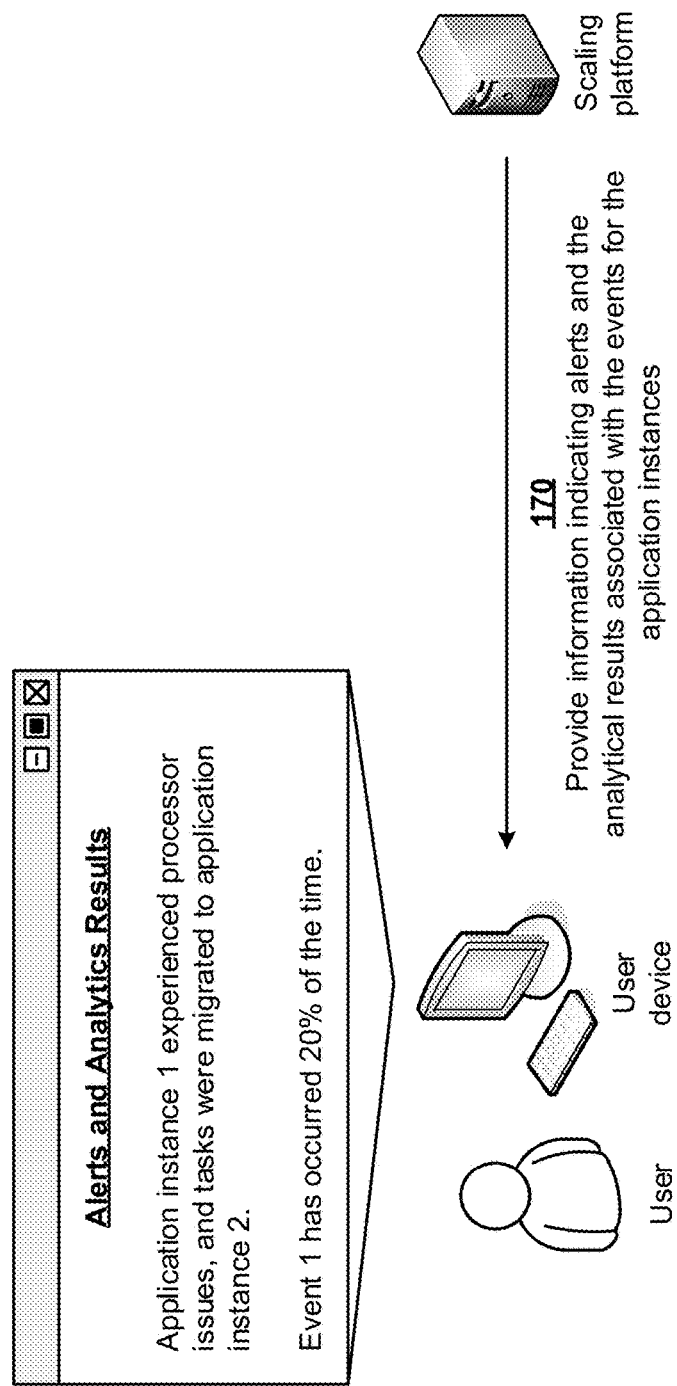

As shown in FIG. 1H, and by reference number 170, the scaling platform may provide, to a user device, information indicating alerts and the analytical results associated with the events for the application instances. In some implementations, the scaling platform may provide, to the user device, the information indicating the alerts and the analytical results when the alerts and the analytical results are generated by the scaling platform, upon request from a user of the user device, periodically (e.g., daily, weekly, monthly, etc.), and/or the like. In some implementations, the information indicating the alerts may include information indicating an operation state of the scaling platform, errors associated with the scaling platform, errors associated with the application instances, failures associated with the application instances, and/or the like.

In some implementations, the user device may display the information indicating the alerts and the analytical results to the user via a user interface. For example, the user interface may display information indicating that a first application instance (e.g., application instance 1) experienced processor issues and tasks were migrated to a second application instance (e.g., application instance 2), that a first event (e.g., event 1) has occurred 20% of the time, and/or the like.

In this way, several different stages of the process for utilizing machine learning to proactively scale cloud instances in a cloud computing environment are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically and proactively scales cloud instances in a cloud computing environment, as described herein. Finally, automating the process for utilizing machine learning to proactively scale cloud instances in a cloud computing environment conserves computing resources (e.g., processing resources, memory resources, and/or the like) associated with the cloud computing environment and that would otherwise be wasted in attempting to proactively scale cloud instances in the cloud computing environment.

As indicated above, FIGS. 1A-1H are provided merely as examples. Other examples are possible and may differ from what was described with regard to FIGS. 1A-1H.

Figure 2:
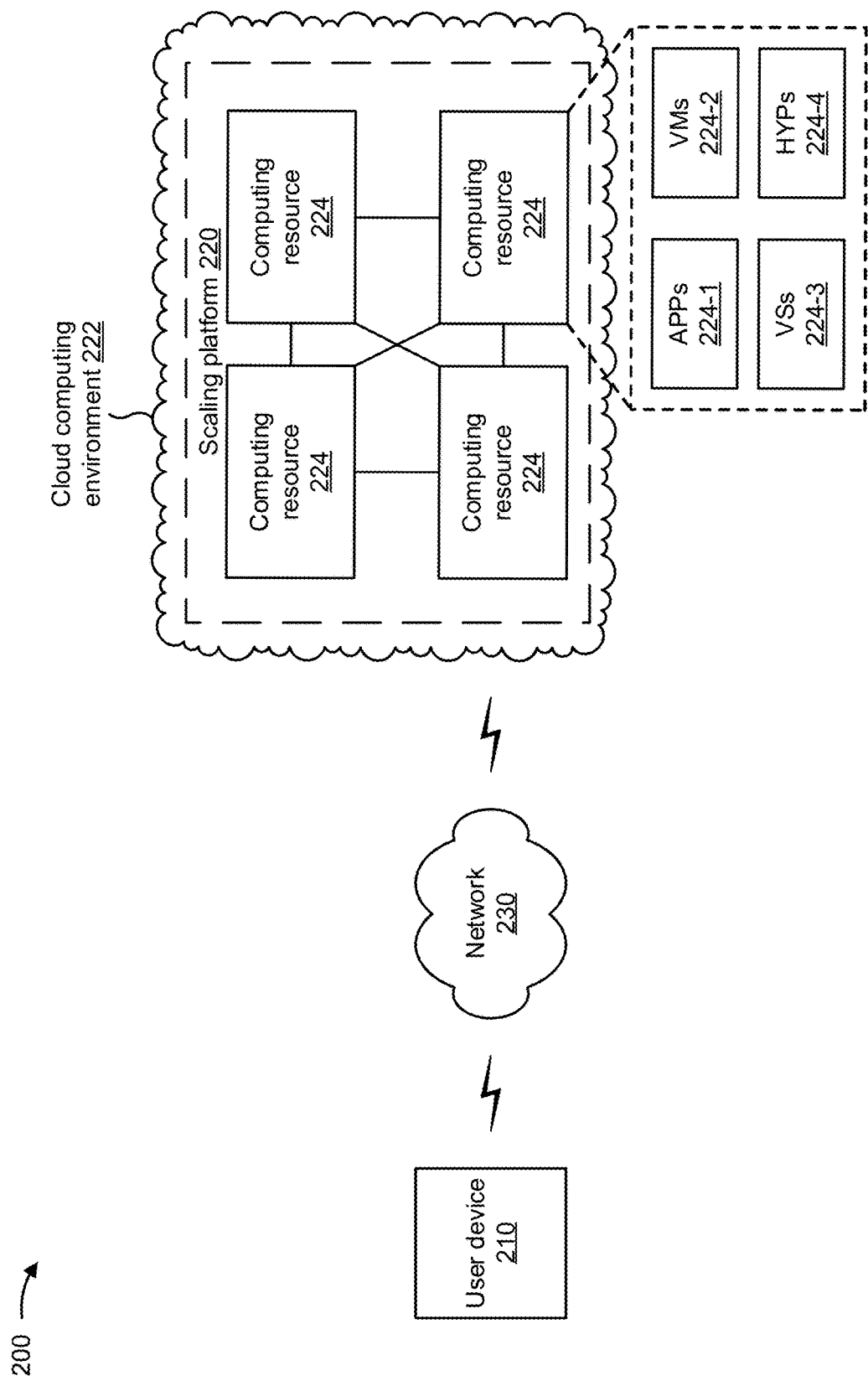
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a scaling platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to scaling platform 220.

Scaling platform 220 includes one or more devices that utilize machine learning to proactively scale cloud instances. In some implementations, scaling platform 220 may be designed to be modular such that certain software components may be swapped in or out depending on a particular need. As such, scaling platform 220 may be easily and/or quickly reconfigured for different uses. In some implementations, scaling platform 220 may receive information from and/or transmit information to one or more user devices 210.

In some implementations, as shown, scaling platform 220 may be hosted in a cloud computing environment 222. Notably, while implementations described herein describe scaling platform 220 as being hosted in cloud computing environment 222, in some implementations, scaling platform 220 may not be cloud-based (i.e., may be implemented outside of a cloud computing environment) or may be partially cloud-based.

Cloud computing environment 222 includes an environment that hosts scaling platform 220. Cloud computing environment 222 may provide computation, software, data access, storage, etc. services that do not require end-user knowledge of a physical location and configuration of system(s) and/or device(s) that hosts scaling platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host scaling platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with scaling platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of scaling platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to user device 210, scaling platform 220, and/or computing resource 224. In some implementations, user device 210, scaling platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to reduce cloud instances in a cloud computing environment. In some implementations, one or more process blocks of FIG. 4 may be performed by a scaling platform (e.g., scaling platform 220). In some implementations, one or more process blocks of FIG. 4 may be performed by another device or a group of devices separate from or including the scaling platform, such as a user device (e.g., user device 210).

As shown in FIG. 4, process 400 may include receiving application usage information associated with application instances in a cloud computing environment for an application (block 410). For example, the scaling platform (e.g., using computing resource 224, processor 320, communication interface 370, and/or the like) may receive application usage information associated with application instances in a cloud computing environment for an application, as described above in connection with FIGS. 1A-2.

As further shown in FIG. 4, process 400 may include processing the application usage information, with a machine learning model, to determine behavior patterns and predicted tasks for the application (block 420). For example, the scaling platform (e.g., using computing resource 224, processor 320, memory 330, and/or the like) may process the application usage information, with a machine learning model, to determine behavior patterns and predicted tasks for the application, as described above in connection with FIGS. 1A-2.

As further shown in FIG. 4, process 400 may include determining a modified quantity of the application instances based on the behavior patterns and the predicted tasks (block 430). For example, the scaling platform (e.g., using computing resource 224, processor 320, storage component 340, communication interface 370, and/or the like) may determine a modified quantity of the application instances based on the behavior patterns and the predicted tasks, as described above in connection with FIGS. 1A-2.

As further shown in FIG. 4, process 400 may include causing the modified quantity of the application instances to be implemented in the cloud computing environment based on rules (block 440). For example, the scaling platform (e.g., using computing resource 224, processor 320, memory 330, communication interface 370, and/or the like) may cause the modified quantity of the application instances to be implemented in the cloud computing environment based on rules, as described above in connection with FIGS. 1A-2.

As further shown in FIG. 4, process 400 may include storing information associated with the modified quantity of the application instances in a data structure (block 450). For example, the scaling platform (e.g., using computing resource 224, processor 320, storage component 340, and/or the like) may store information associated with the modified quantity of the application instances in a data structure, as described above in connection with FIGS. 1A-2.

As further shown in FIG. 4, process 400 may include updating the machine learning model based on the information associated with the modified quantity of the application instances stored in the data structure (block 460). For example, the scaling platform (e.g., using computing resource 224, processor 320, storage component 340, and/or the like) may update the machine learning model based on the information associated with the modified quantity of the application instances stored in the data structure, as described above in connection with FIGS. 1A-2.

Process 400 may include additional implementations, such as any single implementation or any combination of implementations described below and/or described with regard to any other process described herein.

In some implementations, the scaling platform may receive information indicating an event for a particular application instance of the application instances, and may cause an action to be taken to address the event for the particular application instance based on the one or more rules. In some implementations, the event may include an issue with a processor associated with the particular application instance, memory associated with the particular application instance, the application provided by the particular application instance, and/or the like. In some implementations, the scaling platform may receive information indicating events for one or more of the application instances, may perform an analytical analysis of the information indicating the events for the one or more of the application instances to generate analytical results, and may provide the analytical results.

In some implementations, the scaling platform may receive information indicating an event for a particular application instance of the application instances, and may provide, to a user device, information indicating an alert associated with the event for the particular application instance. In some implementations, the application usage information may include information indicating a first quantity of times that the application is utilized for a particular week, information indicating a second quantity of times that the application is utilized for a particular day of a particular month, information indicating a third quantity of times that the application is utilized for a particular hour of another particular day, and/or the like. In some implementations, the machine learning model may include a simple linear regression model, an ordinary least squares model, a gradient descent model, a least absolute shrinkage and selection operator (lasso) regression model, a Ridge regression model, a neural network model, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning to proactively scale cloud instances in a cloud computing environment and for performing an action to address an event. In some implementations, one or more process blocks of FIG. 5 may be performed by a scaling platform (e.g., scaling platform 220). In some implementations, one or more process blocks of FIG. 5 may be performed by another device or a group of devices separate from or including the scaling platform, such as a user device (e.g., user device 210).

As shown in FIG. 5, process 500 may include receiving application usage information associated with application instances in a cloud computing environment for an application (block 510). For example, the scaling platform (e.g., using computing resource 224, processor 320, communication interface 370, and/or the like) may receive application usage information associated with application instances in a cloud computing environment for an application, as described above in connection with FIGS. 1A-2.

As further shown in FIG. 5, process 500 may include processing the application usage information, with a machine learning model, to determine behavior patterns and predicted tasks for the application (block 520). For example, the scaling platform (e.g., using computing resource 224, processor 320, memory 330, and/or the like) may process the application usage information, with a machine learning model, to determine behavior patterns and predicted tasks for the application, as described above in connection with FIGS. 1A-2.

As further shown in FIG. 5, process 500 may include determining a modified quantity of the application instances based on the behavior patterns and the predicted tasks (block 530). For example, the scaling platform (e.g., using computing resource 224, processor 320, storage component 340, communication interface 370, and/or the like) may determine a modified quantity of the application instances based on the behavior patterns and the predicted tasks, as described above in connection with FIGS. 1A-2.

As further shown in FIG. 5, process 500 may include causing the modified quantity of the application instances to be implemented in the cloud computing environment based on rules (block 540). For example, the scaling platform (e.g., using computing resource 224, processor 320, memory 330, communication interface 370, and/or the like) may cause the modified quantity of the application instances to be implemented in the cloud computing environment based on rules, as described above in connection with FIGS. 1A-2.

As further shown in FIG. 5, process 500 may include receiving information indicating an event for a particular application instance of the application instances (block 550). For example, the scaling platform (e.g., using computing resource 224, processor 320, communication interface 370, and/or the like) may receive information indicating an event for a particular application instance of the application instances, as described above in connection with FIGS. 1A-2.

As further shown in FIG. 5, process 500 may include causing an action to be taken to address the event for the particular application instance based on the rules (block 560). For example, the scaling platform (e.g., using computing resource 224, processor 320, memory 330, communication interface 370, and/or the like) may cause an action to be taken to address the event for the particular application instance based on the rules, as described above in connection with FIGS. 1A-2.

Process 500 may include additional implementations, such as any single implementation or any combination of implementations described below and/or described with regard to any other process described herein.

In some implementations, the scaling platform may store information associated with the modified quantity of the application instances in a data structure, and may update the machine learning model based on the information associated with the modified quantity of the application instances stored in the data structure. In some implementations, the scaling platform may store, in a data structure, information associated with the action to be taken to address the event for the particular application instance, and may update the machine learning model based on the information associated with the action to be taken to address the event for the particular application instance stored in the data structure. In some implementations, the scaling platform may provide, to a user device, information indicating an alert associated with the event for the particular application instance.

In some implementations, the scaling platform may receive information indicating events for one or more of the application instances, may perform an analytical analysis of the information indicating the events for the one or more of the application instances to generate analytical results, and may provide the analytical results. In some implementations, the event may include an issue with a processor associated with the particular application instance, memory associated with the particular application instance, the application provided by the particular application instance, and/or the like. In some implementations, the application usage information may include information indicating a quantity of times that the application is utilized for a particular time period.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning to proactively scale cloud instances in a cloud computing environment and for providing alerts. In some implementations, one or more process blocks of FIG. 6 may be performed by a scaling platform (e.g., scaling platform 220). In some implementations, one or more process blocks of FIG. 6 may be performed by another device or a group of devices separate from or including the scaling platform, such as a user device (e.g., user device 210).

As shown in FIG. 6, process 600 may include receiving application usage information associated with application instances in a cloud computing environment for an application (block 610). For example, the scaling platform (e.g., using computing resource 224, processor 320, communication interface 370, and/or the like) may receive application usage information associated with application instances in a cloud computing environment for an application, as described above in connection with FIGS. 1A-2.

As further shown in FIG. 6, process 600 may include processing the application usage information, with a machine learning model, to determine behavior patterns and predicted tasks for the application (block 620). For example, the scaling platform (e.g., using computing resource 224, processor 320, memory 330, and/or the like) may process the application usage information, with a machine learning model, to determine behavior patterns and predicted tasks for the application, as described above in connection with FIGS. 1A-2.

As further shown in FIG. 6, process 600 may include determining a modified quantity of the application instances based on the behavior patterns and the predicted tasks (block 630). For example, the scaling platform (e.g., using computing resource 224, processor 320, storage component 340, communication interface 370, and/or the like) may determine a modified quantity of the application instances based on the behavior patterns and the predicted tasks, as described above in connection with FIGS. 1A-2.

As further shown in FIG. 6, process 600 may include causing the modified quantity of the application instances to be implemented in the cloud computing environment based on rules (block 640). For example, the scaling platform (e.g., using computing resource 224, processor 320, memory 330, communication interface 370, and/or the like) may cause the modified quantity of the application instances to be implemented in the cloud computing environment based on rules, as described above in connection with FIGS. 1A-2.

As further shown in FIG. 6, process 600 may include receiving information indicating an event for a particular application instance of the application instances (block 650). For example, the scaling platform (e.g., using computing resource 224, processor 320, communication interface 370, and/or the like) may receive information indicating an event for a particular application instance of the application instances, as described above in connection with FIGS. 1A-2.

As further shown in FIG. 6, process 600 may include providing information indicating an alert associated with the event for the particular application instance (block 660). For example, the scaling platform (e.g., using computing resource 224, processor 320, memory 330, communication interface 370, and/or the like) may provide information indicating an alert associated with the event for the particular application instance, as described above in connection with FIGS. 1A-2.

Process 600 may include additional implementations, such as any single implementation or any combination of implementations described below and/or described with regard to any other process described herein.

In some implementations, the scaling platform may store information associated with the modified quantity of the application instances in a data structure, and may update the machine learning model based on the information associated with the modified quantity of the application instances stored in the data structure. In some implementations, the scaling platform may cause an action to be taken to address the event for the particular application instance based on the one or more rules.

In some implementations, the scaling platform may receive information indicating events for one or more of the application instances, may perform an analytical analysis of the information indicating the events for the one or more of the application instances to generate analytical results, and may provide the analytical results to the user device. In some implementations, the event may include an issue with a processor associated with the particular application instance, memory associated with the particular application instance, the application provided by the particular application instance, and/or the like. In some implementations, the scaling platform may store, in a data structure, information associated with an action to be taken to address the event for the particular application instance, and may update the machine learning model based on the information associated with the action to be taken to address the event for the particular application instance stored in the data structure.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a scaling platform that utilizes machine learning to proactively scale cloud instances in a cloud computing environment. For example, the scaling platform may receive, from a cloud computing environment, application usage information associated with application instances in the cloud computing environment for an application, and may process the application usage information, with a machine learning model, to determine behavior patterns and predicted tasks for the application. The scaling platform may determine a modified quantity of the application instances based on the behavior patterns and the predicted tasks for the application, and may cause the modified quantity of the application instances to be implemented in the cloud computing environment based on one or more rules. The scaling platform may store information associated with the modified quantity of the application instances in a data structure, and may update the machine learning model based on the information associated with the modified quantity of the application instances stored in the data structure.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
     receive, from a cloud computing environment, application utilization information associated with application instances in the cloud computing environment for an application and for a plurality of time periods;
     process the application utilization information, with a machine learning model, to cause the machine learning model to output behavior patterns for the application and output predicted tasks for the application, the predicted tasks, output by the machine learning model, including:
       a first task, performed by the application, that causes the application instances for the application to be over-utilized, and
       a second task, performed by the application, that causes the application instances for the application to be under-utilized, and the behavior patterns, output by the machine learning model, indicating:
         at least one first time period when the application is predicted to be performing the first task, and
         at least one second time period when the application is predicted to be performing the second task;
     determine a modified quantity of the application instances based on:
       at least one of the first task or the second task, and
       at least one of the at least one first time period, or the at least one second time period;
     cause the modified quantity of the application instances to be implemented in the cloud computing environment based on one or more rules, the one or more rules defining requirements associated with the application;
     store a value identifying the modified quantity of the application instances in a data structure;
     train or retrain the machine learning model based on the value identifying the modified quantity of the application instances stored in the data structure;
     after implementation of the modified quantity of the application instances, receive information indicating a code failure occurred for a particular application instance of the application instances;
     perform an analytical analysis of the information indicating the code failure to determine that a portion of code, associated with the particular application instance, is causing over-utilization of the particular application instance and is to be rewritten or removed;
     cause the portion of the code to be rewritten or removed, based on the one or more rules, to address the code failure;
     store, in the data structure, information identifying whether, in addressing the code failure, the portion of the code was rewritten or removed; and
     train or re-train the machine learning model based on the information identifying whether the portion of the code was rewritten or removed.

2. The device of claim 1, wherein the one or more processors are further to:
   receive information indicating an event for another application instance of the application instances; and
   cause an action to be taken to address the event for the other application instance based on the one or more rules.

3. The device of claim 2, wherein the event includes an issue with one or more of:
   a processor associated with the other application instance,
   memory associated with the other application instance, or
   the application provided by the other application instance.

4. The device of claim 1, wherein the one or more processors are further to:
   receive information indicating events for one or more of the application instances;
   perform another analytical analysis of the information indicating the events for the one or more of the application instances to generate analytical results; and
   provide the analytical results.

5. The device of claim 1, wherein the one or more processors are further to:
   receive information indicating an event for another application instance of the application instances; and
   provide, to a user device, information indicating an alert associated with the event for the other application instance.

6. The device of claim 1, wherein the application utilization information includes one or more of:
   information indicating a first quantity of times that the application is utilized for a particular week,
   information indicating a second quantity of times that the application is utilized for a particular day of a particular month, or
   information indicating a third quantity of times that the application is utilized for a particular hour of another particular day.

7. The device of claim 1, wherein the machine learning model includes one or more of:
   a simple linear regression model,
   an ordinary least squares model,
   a gradient descent model,
   a least absolute shrinkage and selection operator (lasso) regression model,
   a Ridge regression model, or
   a neural network model.

8. A non-transitory computer-readable medium storing instructions, the instructions comprising:
   one or more instructions that, when executed by one or more processors of a device, cause the one or more processors to:
      receive, from a cloud computing environment, application utilization information associated with application instances in the cloud computing environment for an application and for a plurality of time periods;
      process the application utilization information, with a machine learning model, to cause the machine learning model to output behavior patterns for the application and output predicted tasks for the application,
      the predicted tasks, output by the machine learning model, including:
         a first task, performed by the application, that causes the application instances for the application to be over-utilized,
         a second task, performed by the application, that causes the application instances for the application to be under-utilized, and the behavior patterns, output by the machine learning model, indicating:
            at least one first time period when the application is predicted to be performing the first task, and
            at least one second time period when the application is predicted to be performing the second task;
      determine a modified quantity of the application instances based on:
         at least one of the first task or the second task, and
         at least one of the at least one first time period, or the at least one second time period;
      cause the modified quantity of the application instances to be implemented in the cloud computing environment based on one or more rules,
         the one or more rules defining requirements associated with the application;
      receive, after implementation of the modified quantity of the application instances, information indicating a code failure for a particular application instance of the application instances;
      perform an analytical analysis of the information indicating the code failure to determine that a portion of code, associated with the particular application instance, is causing over-utilization of the particular application instance and is to be rewritten or removed;
      cause the portion of the code to be rewritten or removed to address the code failure for the particular application instance based on the one or more rules;
      store, in a data structure, information identifying whether, in addressing the code failure, the portion of the code was rewritten or removed; and
      train or retrain the machine learning model based on the information identifying whether the portion of the code was rewritten or removed.

9. The non-transitory computer-readable medium of claim 8, wherein the instructions further comprise:
   one or more instructions that, when executed by the one or more processors, cause the one or more processors to:
      store information associated with the modified quantity of the application instances in the data structure; and
      update the machine learning model based on the information associated with the modified quantity of the application instances stored in the data structure.

10. The non-transitory computer-readable medium of claim 8, wherein the instructions further comprise:
    one or more instructions that, when executed by the one or more processors, cause the one or more processors to:
       receive information indicating an event for another application instance of the application instances;
       cause an action to be taken to address the event for the other application instance based on the one or more rules;
       store, in the data structure, information associated with the action to be taken to address the event for the other application instance; and
       update the machine learning model based on the information associated with the action to be taken to address the event for the other application instance.

11. The non-transitory computer-readable medium of claim 8, wherein the instructions further comprise:
    one or more instructions that, when executed by the one or more processors, cause the one or more processors to:
       provide, to a user device, information indicating an alert associated with the code failure.

12. The non-transitory computer-readable medium of claim 8, wherein the instructions further comprise:
    one or more instructions that, when executed by the one or more processors, cause the one or more processors to:
       receive information indicating events for one or more of the application instances;
       perform another analytical analysis of the information indicating the events for the one or more of the application instances to generate analytical results; and
       provide the analytical results.

13. The non-transitory computer-readable medium of claim 10, wherein the event includes an issue with one or more of:

a processor associated with the other application instance, memory associated with the other application instance, or the application provided by the other application instance.

14. The non-transitory computer-readable medium of claim 8, wherein the application utilization information includes information indicating a quantity of times that the application is utilized for a particular time period.

15. A method, comprising:
receiving, by a device and from a cloud computing environment, application utilization information associated with application instances in the cloud computing environment for an application and for a plurality of time periods;
processing, by the device, the application utilization information, with a machine learning model, to cause the machine learning model to output behavior patterns for the application and output predicted tasks for the application,
the predicted tasks, output by the machine learning model, including:
a first task, performed by the application, that causes the application instances for the application to be over-utilized,
a second task, performed by the application, that causes the application instances for the application to be under-utilized, and the behavior patterns, output by the machine learning model, indicating:
at least one first time period when the application is predicted to be performing the first task, and
at least one second time period when the application is predicted to be performing the second task;
determining, by the device, a modified quantity of the application instances based on:
at least one of the first task or the second task, and
at least one of the at least one first time period, or the at least one second time period;
causing, by the device, the modified quantity of the application instances to be implemented in the cloud computing environment based on one or more rules, the one or more rules defining requirements associated with the application;
receiving, by the device and after implementation of the modified quantity of the application instances, information indicating a code failure for a particular application instance of the application instances;
performing, by the device, an analytical analysis of the information indicating the code failure to determine that a portion of code, associated with the particular application instance, is causing over-utilization of the particular application instance and is to be rewritten or removed;
causing, by the device, the portion of the code to be rewritten or removed to address the code failure for the particular application instance based on the one or more rules;
storing, by the device and in a data structure, information identifying whether, in addressing the code failure, causing the portion of the code was rewritten or removed; and
training or retraining, by the device, the machine learning model based on the information identifying whether the portion of the code was rewritten or removed.

16. The method of claim 15, further comprising:
storing information associated with the modified quantity of the application instances in the data structure; and
updating the machine learning model based on the information associated with the modified quantity of the application instances.

17. The method of claim 15, further comprising:
providing, to a user device, information indicating an alert associated with the code failure.

18. The method of claim 15, further comprising:
receiving information indicating events for one or more of the application instances;
performing another analytical analysis of the information indicating the events for the one or more of the application instances to generate analytical results; and
providing the analytical results to a user device.

19. The method of claim 18, wherein the events for the one or more of the application instances include an issue with one or more of:
a processor associated with the one or more of the application instances,
memory associated with the one or more of the application instances, or
the application provided by the one or more of the application instances.

20. The method of claim 18, further comprising:
storing, in the data structure, information associated with an action to be taken to address the events for the one or more of the application instances; and
updating the machine learning model based on the information associated with the action to be taken to address the events for the one or more of the application instances.

* * * * *